United States Patent
Iida et al.

(10) Patent No.: US 10,781,320 B2
(45) Date of Patent: Sep. 22, 2020

(54) WATER-DISPERSED ELECTRODEPOSITION SOLUTION FOR FORMING INSULATING FILM

(71) Applicant: MITSUBISHI MATERIALS CORPORATION, Tokyo (JP)

(72) Inventors: Shintaro Iida, Naka (JP); Hideaki Sakurai, Naka-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 65 days.

(21) Appl. No.: 15/574,972

(22) PCT Filed: May 17, 2016

(86) PCT No.: PCT/JP2016/064580
§ 371 (c)(1),
(2) Date: Nov. 17, 2017

(87) PCT Pub. No.: WO2016/190164
PCT Pub. Date: Dec. 1, 2016

(65) Prior Publication Data
US 2018/0127600 A1    May 10, 2018

(30) Foreign Application Priority Data

May 25, 2015 (JP) .................................. 2015-105153
Mar. 29, 2016 (JP) .................................. 2016-065026

(51) Int. Cl.
| | |
|---|---|
| *C09D 5/44* | (2006.01) |
| *C09D 179/08* | (2006.01) |
| *C09D 5/02* | (2006.01) |
| *H01B 3/30* | (2006.01) |
| *C08J 3/07* | (2006.01) |
| *C08G 73/14* | (2006.01) |
| *C08G 73/16* | (2006.01) |
| *C25D 13/04* | (2006.01) |

(52) U.S. Cl.
CPC ........... *C09D 5/4461* (2013.01); *C08G 73/14* (2013.01); *C08G 73/16* (2013.01); *C08J 3/07* (2013.01); *C09D 5/02* (2013.01); *C09D 5/022* (2013.01); *C09D 5/4419* (2013.01); *C09D 5/4423* (2013.01); *C09D 179/08* (2013.01); *C25D 13/04* (2013.01); *H01B 3/306* (2013.01); *C08J 2379/08* (2013.01)

(58) Field of Classification Search
CPC ........ C09D 5/4461; C09D 5/02; C09D 5/022; C09D 5/4419; C09D 5/4423; C09D 179/08; C09D 5/4411; C09D 5/4442; C09D 5/4492; C09D 163/04; C09D 5/44; C08G 73/14; C08G 73/16; C08G 73/00; C08G 73/10; C08J 3/07; C08J 2379/08; C25D 13/04; C25D 13/16; H01B 3/306; H01B 3/447; H01B 13/065; H01B 13/16
See application file for complete search history.

(56) References Cited

U.S. PATENT DOCUMENTS

| | | | | |
|---|---|---|---|---|
| 3,850,773 | A | * 11/1974 | Lupinski | C09D 5/4461 204/482 |
| 4,051,091 | A | 9/1977 | Shibayama et al. | |
| 2006/0219569 | A1* | 10/2006 | Kawanami | C09D 5/4411 205/317 |
| 2015/0247060 | A1 | 9/2015 | Gouider et al. | |
| 2015/0252060 | A1 | 9/2015 | Watanabe et al. | |

FOREIGN PATENT DOCUMENTS

| | | |
|---|---|---|
| CN | 101010390 A | 8/2007 |
| EP | 3418336 A1 | 12/2018 |
| FR | 2995312 A1 | 3/2014 |
| GB | 1486325 A | 9/1977 |
| JP | 64-043578 A | 2/1989 |
| JP | 2002-020893 A | 1/2002 |
| JP | 2006-052268 A | 2/2006 |
| JP | 2007-149824 A | 6/2007 |
| JP | 2011-256318 A | 12/2011 |
| JP | 5555063 B | 7/2014 |
| WO | WO-00/44840 A1 | 8/2000 |

OTHER PUBLICATIONS

Supplemental European Search Report dated Jan. 23, 2019 in corresponding European Application No. EP 16799870.7.
Office Action dated Apr. 9, 2019 for the corresponding Chinese Patent Application No. 201680025739.5.
International Search Report dated Jun. 21, 2016 for the corresponding PCT Application No. PCT/JP2016/064580.
European Search Report dated Aug. 6, 2019 for the related European Patent Application No. 16878086.4.
Chinese Office Action dated Oct. 11, 2019 for the related Chinese Patent Application No. 201680074952.5.
International Search Report dated Nov. 8, 2016 for the related PCT Application No. PCT/JP2016/078424.
Non-Final Office Action dated Oct. 21, 2019 for the related U.S. Appl. No. 16/064,383.

(Continued)

*Primary Examiner* — Xiuyu Tai
(74) *Attorney, Agent, or Firm* — Leason Ellis LLP

(57) ABSTRACT

A water-dispersed electrodeposition solution (11) for forming an insulating film includes: polymer particles; an organic solvent; a basic compound; and water. The polymer particles are made of: any one of; or both of polyamide-imide and polyester-imide, main chains thereof being free of an anionic group, a number-based median diameter $D_{50}$ of the polymer particles is 0.05 μm to 0.5 μm, and polymer particles having a particle size within −30% to +30% of the number-based median diameter $D_{50}$ are 50% or more of all of the polymer particles on a number basis.

5 Claims, 1 Drawing Sheet

(56) References Cited

OTHER PUBLICATIONS

Final Office Action dated Apr. 6, 2020 for the related U.S. Appl. No. 16/064,383.
Xu Feng, "Architectural paints and coating technology", *Chemical Industry Press*, May 1998, p. 34 (No English translation submitted.).
Chinese Office Action dated Apr. 22, 2020 for the corresponding Chinese Patent Application No. 201680074952.5.
Japanese Office Action dated Jun. 2, 2020 for the related Japanese Patent Application No. 2016-166752.

* cited by examiner

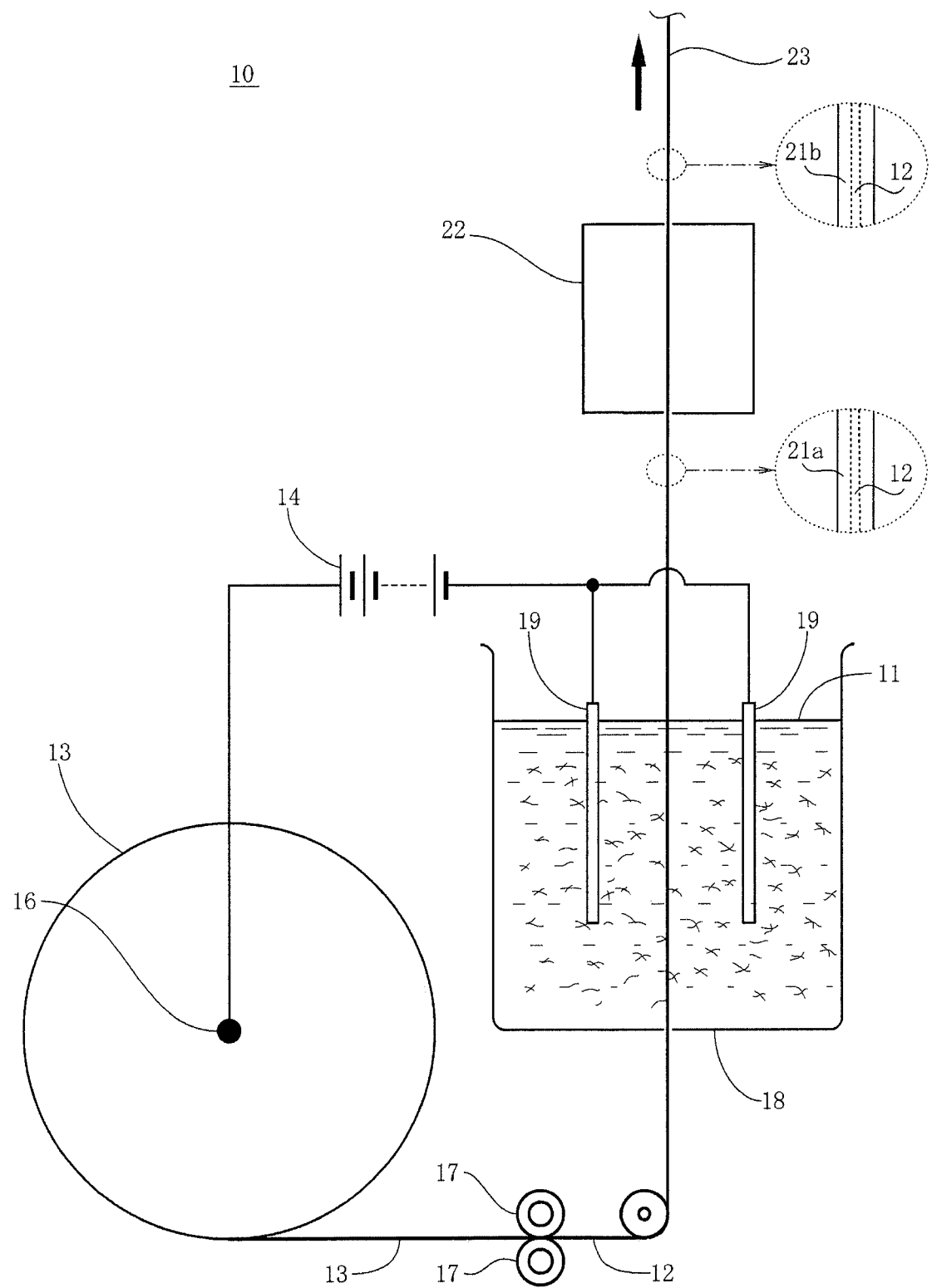

WATER-DISPERSED ELECTRODEPOSITION SOLUTION FOR FORMING INSULATING FILM

CROSS-REFERENCE TO RELATED PATENT APPLICATIONS

This application is a U.S. National Phase Application under 35 U.S.C. § 371 of International Patent Application No. PCT/JP2016/064580 filed on May 17, 2016 and claims the benefit of Japanese Patent Applications No. 2015-105153, filed May 25, 2015 and No. 2016-065026, filed Mar. 29, 2016, all of which are incorporated herein by reference in their entireties. The International Application was published in Japanese on Dec. 1, 2016 as International Publication No. WO/2016/190164 under PCT Article 21(2).

FIELD OF THE INVENTION

The present invention relates to a water-dispersed electrodeposition solution for forming an insulating film, which is used in forming an insulator of the electrical insulated wire or the like by the electrodeposition method.

BACKGROUND OF THE INVENTION

Conventionally, insulators such as the electrical insulated wires or the like, in which the surface of the electrical wire is coated by an insulating film, are used for motors, reactors, transformers and the like. As a method for forming an insulating film on the surface of the electric wire, a dipping method, an electrodeposition method (electrodeposition coating), and the like are known. In the dipping method, for example, a rectangular conductor or the like is used as the object to be coated. By repeating a process in which the object is dipped in a coating material, pulled up, and then dried, an insulating film having an intended film thickness is formed. The electrodeposition method is a method, in which an insulating film is formed by applying direct current to: an object to be coated, which is dipped in an electrodeposition coating material (electrodeposition solution), and an electrode inserted into the electrodeposition coating material, to allow charged coating material particles to be precipitated on the side of the object to be coated.

The electrodeposition method draws attention because: it is easier to coat with a uniform film thickness than other methods; and an insulating film having high rust prevention ability and adhesiveness after baking can be formed. Accordingly, varieties of improvements have been made. For example, as a coating material used in the electrodeposition method, a suspended polyimide electrodeposition coating material is disclosed (for example, refer to Japanese Patent (Granted) No. 5555063 (B)). In the suspended polyimide electrodeposition coating material disclosed in Japanese Patent (Granted) No. 5555063 (B), block copolymer polyimide particles, which have a cyclohexane bond in the molecular frame thereof and an anionic group in the molecule, with predetermined average particle size and particle size distribution are dispersed. It is described that the electrodeposition material is hardly degraded in a long-term storage with excellent storage stability; and an electrodeposition film with highly uniform film properties can be formed at a high electrodeposition rate by using the electrodeposition coating material.

In addition, as an electrodeposition material used for the electrodeposition method, an electrodeposition material containing a polyamide-imide-based material as the main component and polydimethylsiloxane introduced into the molecular chain of the polyamide-imide-based material is disclosed (for example, refer to Japanese Unexamined Patent Application, First Publication No. 2002-20893 (A)). With this electrodeposition material, by using the polyamide-imide-based material having a predetermined molecular structure, it is possible to impart heat resistance required especially for coating of a sliding member and the like, and it is also possible to suppress cracking or the like of the electrodeposition coating film.

Technical Problem

In the above-described conventional Japanese Patent (Granted) No. 5555063 (B), since it is necessary to use polyimide particles having anionic groups in the molecule, the surface potential of the particles is increased, and the storage stability of the electrodeposition solution is improved. However, it is necessary to use a diamine having a carboxyl group or a sulfonic acid group, or to use a tetra-carboxylic acid anhydride having a carboxyl group or a sulfonic acid group that does not contribute to an imide bonding, so that the type of monomers that can be used is limited. Therefore, there is a problem of high production cost in Japanese Patent (Granted) No. 5555063 (B). Moreover, in order to lower the viscosity of the polyimide varnish at the time of preparing the electrodeposition solution, it is necessary to heat and thermally dissolute the polyimide varnish. However, since accurate temperature control for maintaining uniformity of particles is required, the production cost is increased further. On the other hand, in the above-described conventional Japanese Unexamined Patent Application, First Publication No. 2002-20893 (A), a water-soluble polyamide-imide is used as a resin, and a continuous film insoluble in water is formed on the conductor surface during electrodeposition. Therefore, if the formation of the coating proceeds to some extent, the subsequent electrodeposition efficiency deteriorates and it is difficult to form an insulating film having a desired thickness.

A purpose of the present invention is to provide: a water-dispersed electrodeposition solution, in which varieties of monomers can be used, and there is no need to perform an operation of thermal dissolution or the like in preparation of the electrodeposition solution. The water-dispersed electrodeposition solution can be easily produced at low cost. The insulation coating to be formed can be thickened easily. In addition, the water-dispersed electrodeposition solution has excellent storage stability. Additionally, a method of producing an insulator by using the electrodeposition solution is provided.

SUMMARY OF THE INVENTION

Solution to Problem

The first aspect of the present invention is a water-dispersed electrodeposition solution for forming an insulating film including: polymer particles; an organic solvent; a basic compound; and water, wherein the polymer particles are made of: any one of; or both of polyamide-imide and polyester-imide, main chains thereof being free of an anionic group, a number-based median diameter $D_{50}$ of the polymer particles is 0.05 µm to 0.5 µm, and polymer particles having a particle size within −30% to +30% of the number-based median diameter $D_{50}$ are 50% or more of all of the polymer particles on a number basis.

The second aspect of the present invention is the water-dispersed electrodeposition solution for forming an insulating film according to the above-described first aspect of the present invention, wherein a surface potential of the polymer particles is −30 mV to −70 mV.

The third aspect of the present invention is the water-dispersed electrodeposition solution for forming an insulating film according to the above-described first or second aspect of the present invention, wherein the basic compound is a hydrophobic basic compound.

The fourth aspect of the present invention is a method of producing an insulator comprising a step of forming an insulating film on a metal surface by using the water-dispersed electrodeposition solution for forming an insulating film according to any one of above-described first to third aspect of the present invention.

Advantageous Effects of Invention

The water-dispersed electrodeposition solution for forming an insulating film, which is the first aspect off the present invention, (hereinafter, referred as "the water-dispersed electrodeposition solution of the present invention") includes: polymer particles; an organic solvent; a basic compound; and water, wherein the polymer particles are made of: any one of; or both of polyamide-imide and polyester-imide, main chains thereof being free of an anionic group. In addition, these polymer particles have the predetermined median diameter ($D_{50}$); and are controlled to obtain the predetermined particle distribution. Therefore, varieties of monomers can be used for synthesizing the polymer; there is no need for performing the operation of thermal dissolution or the like in preparation of the electrodeposition solution; and it can be easily produced at low cost. Moreover, the insulating film to be formed can be easily thickened; and the electrodeposition solution has excellent storage stability.

In the water-dispersed electrodeposition solution for forming an insulating film, which is the second aspect off the present invention, (hereinafter, referred as "the water-dispersed electrodeposition solution of the present invention"), a surface potential of the polymer particles is −30 mV to −70 mV additionally. In this electrodeposition solution, the dispersion stability of the polymer particles is extremely excellent even if the potential on the surfaces of the polymer particles showed such a relatively low value, since the median diameter ($D_{50}$) of the polymer particles or the like is controlled as described above.

In the water-dispersed electrodeposition solution for forming an insulating film, which is the third aspect off the present invention, (hereinafter, referred as "the water-dispersed electrodeposition solution of the present invention"), the basic compound is a hydrophobic basic compound. Thus, the storage stability of the electrodeposition solution after preparation thereof can be improved further.

The method of producing a water-dispersed electrodeposition solution for forming an insulating film, which is the fourth aspect off the present invention, (hereinafter, referred as "the method of producing the water-dispersed electrodeposition solution of the present invention"), has a step of forming an insulating film on a metal surface by using the water-dispersed electrodeposition solution for forming an insulating film according to the above-described water-dispersed electrodepositions solution. Therefore, the electrical insulating wire with a thick insulating film or the like can be easily produced at low cost.

BRIEF DESCRIPTION OF THE DRAWINGS

FIG. 1 is a diagram schematically showing an electrodeposition coating apparatus according to an embodiment of the present invention.

DETAILED DESCRIPTION OF THE INVENTION

Embodiments for carrying out the present invention will be described in reference to the drawings below.

The water-dispersed electrodepositing solution for forming an insulating film of the present invention includes: polymer particles; an organic solvent, a basic compound; and water. The polymer particles are made of: any one of; or both of polyamide-imide and polyester-imide, main chains thereof being free of an anionic group. As described above, the polymer particles free of an anionic group are used. Thus, varieties of monomers can be used for synthesizing the polymer particles. The polyamide-imide or polyester-imide free of an anionic group in the main chain mean polyamide-imide or polyester-imide which does not have an anionic group on the carbon atom at least other than the main chain terminal. The anionic group is the functional group having a property that a proton or the like is eliminated in a basic solution and negatively charged like the —COO⁻ group or the like, such as the —COOH group (carboxyl group), —SO₃H (sulfonic group) and the like. In macromolecule (polymer) having the anionic group in the main chain, monomers used in its synthesis have to have the anionic group. Thus, options for the monomers are limited for the production cost to be increased. Contrary to that, in the polymer free of the anionic group, options for the monomers to be used in the synthesis are broaden, and the production cost is expected to be reduced.

[Macromolecule (Polymer)]

The reason why polyamide-imide and/or polyester-imide are/is used as the polymer constituting the polymer particles is because it is superior to other polymers in terms of heat resistance, flexibility, and production cost. The polyamide-imide constituting the polymer particles is obtained by using a diisocyanate component containing an aromatic diisocyanate component and an acid component containing trimellitic anhydride as a monomer and polymerizing them.

As the diisocyanate component, diphenylmethane-4,4'-diisocyanate (MDI), diphenylmethane-3,3'-diisocyanate, diphenylmethane-3,4'-diisocyanate, diphenyl ether-4,4'-diisocyanate, benzophenone-4,4'-diisocyanate, diphenylsulfone-4,4'-diisocyanate and the like can be used.

As the acid component, trimellitic anhydride (TMA), 1,2,5-trimellitic acid (1,2,5-ETM), biphenyltetracarboxylic dianhydride, benzophenonetetracarboxylic dianhydride, diphenylsulfone tetracarboxylic acid dianhydride, oxydiphthalic acid dianhydride (OPDA), pyromellitic acid dianhydride (PMDA), 4,4'-(2,2'-hexafluoroisopropylidene) diphthalic acid dianhydride can be used.

A polyamide-imide resin varnish can be obtained by mixing equal amounts of these diisocyanate component and acid component and heating them in an organic solvent to cause a polymerization reaction. Each of the diisocyanate component and the acid component may be used singly or in combination of two or more kinds. As the organic solvent, N-methyl-2-pyrrolidone, N, N-dimethyl formamide, 1,3-dimethyl-2-imidazolidinone, N, N-dimethyl acetamide, dimethyl sulfoxide, tetramethyl urea, hexaethyl phosphoric acid tri-amide, γ-butyrolactam, and the like can be used.

On the other hand, the polyester-imide constituting the polymer particles is formed by adding: imide formed from a tricarboxylic acid anhydride and an amine; polyester formed from alcohol and carboxylic acid or alkyl ester thereof; and a free acid group or an anhydride group of imide to the ester forming reaction. The polyester-imide can be obtained by allowing for: a tricarboxylic anhydride; a dicarboxylic acid compound or an alkyl ester thereof; an alcohol compound; and a diamine compound, to react by a known method.

Examples of the tricarboxylic acid anhydride include trimellitic anhydride, 3,4,4'-benzophenonetricarboxylic anhydride, 3,4,4'-biphenyltricarboxylic anhydride, and the like. Of these, trimellitic anhydride is most preferable.

Examples of the dicarboxylic acid compound include: monocyclic aromatic dicarboxylic acids such as terephthalic acid and isophthalic acid; alkyl group-containing phthalic acid such as 2-methyl 1,4-benzenedicarboxylic acid; polynuclear aromatic dicarboxylic acids such as naphthalene dicarboxylic acid; and alicyclic dicarboxylic acid such as cyclohexyl dicarboxylic acid. Alkyl esters of these compounds may also be used.

Examples of the alcohol compound include: dihydric alcohols such as ethylene glycol, neopentyl glycol, propylene glycol, trimethylene glycol, and diethylene glycol; trihydric or higher alcohols such as glycerin, trimethylolpropane, and pentaerythritol; an alcohol having an isocyanurate ring such as tris (hydroxymethyl) isocyanurate, tris (2-hydroxyethyl) isocyanurate or tris (3-hydroxypropyl) isocyanurate.

As the diamine compound, 4,4'-diaminodiphenylmethane, 4,4'-diaminodiphenyl ether, m-phenylenediamine, p-phenylenediamine, 1,4-diaminonaphthalene, hexamethylenediamine, diaminodiphenylsulfone and the like can be used.

Examples of a method of reacting these to synthesize polyester-imide include: a method in which polyester-imide raw material monomers are charged all at once and imidization and esterification are simultaneously carried out; and a method in which a polyester forming component (carboxylic acid compound, alcohol compound) other than the imide acid component (tricarboxylic anhydride, diamine compound, alcohol compound) is reacted in advance, followed by imidization by adding an imide acid component. The synthesis reaction may be carried out in the presence of an organic solvent such as cresol or may be carried out in the absence of a solvent. A polyester-imide resin varnish is obtained by diluting the synthesized polyester-imide with a solvent as required. As diluting solvent, N-methyl 2-pyrrolidone or cresols and the like can be used.

The polymer constituting the polymer particles preferably has no siloxane bond. This is because if the siloxane bond is present, the siloxane bond tends to be thermally decomposed, so that the heat resistance of the insulating film may deteriorate in some cases. The presence or absence of a siloxane bond depends on usage of a monomer containing a siloxane bond. Thus, by using a monomer not containing a siloxane bond, a polymer not having a siloxane bond can be obtained.

The average molecular weight and the like of the polymer constituting the polymer particles are not particularly limited, but if the average molecular weight of the polymer is too small, the liquid storage stability after preparation of the electrodeposition solution may be deteriorated in some cases. Thus, it is preferable that the average molecular weight is in the range of 50,000 to 500,000, for example. If the average molecular weight of the polymer is too small, the liquid storage stability after preparing the electrodeposition solution may be deteriorated. One of the reasons for this is presumed that when the average molecular weight is small, the number of moles of the polymer per unit mass will increase. Thus, the number of polymers that could not be charged by the basic compound contained in the electrodeposition solution in a predetermined ratio increases; and that these aggregate after the preparation of the electrodeposition solution to cause precipitation.

[Particle Size, Particle Size Distribution, Surface Potential of Polymer Particles]

The polymer particles have the number-based median diameter ($D_{50}$) of 0.05 μm to 0.5 μm and polymer particles having the particle size within −30% to +30% of the number-based median diameter $D_{50}$ are 50% or more of all of the polymer particles on the number basis. These mean that: in the polymer particles, the median diameter (D50) is in the range of 0.05 μm to 0.5 μm in measurement of the number-based particle size distribution on the powder made of the polymer particles; and 50% or more of all of the polymer particles distribute in the range of ±30% of the number-based median diameter $D_{50}$ (in the range from [$D_{50}$−0.3$D_{50}$] μm to [$D_{50}$+0.3$D_{50}$] μm) in this particle distribution. In the present specification, the percentage of particles distributed within the range of ±30% of the number-based median diameter ($D_{50}$) and the median diameter ($D_{50}$) (hereinafter, all median diameters are in the number basis) are based on the number-based particle distribution measured with a laser diffraction scattering type particle size distribution measuring apparatus (Model: LA-960 manufactured by Horiba Seisakusho Co., Ltd.). The reason for setting the above-described range of the median diameter ($D_{50}$) of the polymer particles included in the electrodeposition solution is that when the median diameter (D50) is too small, the polymer particles form a continuous film during electrodeposition in forming the insulating film, which is described later for the electrodeposition rate to be gradually decreased, which makes it difficult to thicken the insulating film. The reason why excellent current flow afterward can be maintained even if the formation of the insulating film by electrodeposition proceeds to some extent by controlling the median diameter ($D_{50}$) is that the conductive water contained in the solvent can be retained between the polymer particles easily. On the other hand, if the median diameter ($D_{50}$) is too large, the storage stability of the electrodeposition solution deteriorates and precipitation occurs. The reason why the proportion of particles distributed within the range of ±30% of the median diameter ($D_{50}$) is set to 50% or more is that even when the proportion of the particles becomes too small, the storage stability of the electrodeposition solution becomes poor, and precipitation will occur. Also, from the viewpoint of storage stability, it is preferable that the polymer particles have a median diameter ($D_{50}$) of 0.08 μm to 0.25 μm and the ratio of particles distributed within −30% to +30% of the median diameter ($D_{50}$) is 75% or more.

The surface potential of the polymer particles is preferably in the range of −10 mV to −70 mV, and more preferably in the range of −30 mV to −70 mV. As the absolute value of the surface potential of the polymer particles increases, the electrostatic repulsion between the polymer particles becomes stronger and the dispersibility of the particles increases. However, as the absolute value of the surface potential decreases, the electrostatic repulsion between the particles weakens, and the storage stability of the electrodeposition solution deteriorates by having low dispersibility of the particles. If the storage stability of the electrodeposition solution is poor, problems such as sedimentation and gelation occur. Therefore, in order to keep the excellent storage stability of the electrodeposition solution, it is generally desirable that the polymer particles used exhibit absolute values with a high surface potential. Polymer particles made of polyamide-imide or the like are lower in cost than conventional polyimide particles having anionic group or the like, but have no anionic group, so it is difficult to increase the absolute value of the surface potential. On the other hand, in the present invention, by controlling the median diameter ($D_{50}$) and particle size distribution of the polymer particles to be used as described above for the polymer particles to be stably dispersed in the solution, the excellent storage stability of the electrodeposition solution can be maintained even when the absolute value of the surface potential thereof is low to a certain extent. Having the absolute value of the surface potential of the polymer particles less than the lower limit value is not preferable because it may be difficult to maintain the excellent storage stability even by controlling the above-mentioned median diameter ($D_{50}$) and the like in some cases. On the other hand, it is difficult to obtain polymer particles made of polyamide-imide or the like and having polymer contents exceeding the upper limit value at present. The surface potential of the polymer particles can be controlled by adjusting the mass ratio of the solid content (polyamide-imide resin) contained in the electrodepositing solution and the basic compound in the process of preparing the electrodeposition solution described later.

[Preparation of Electrodeposition Solution]

The water-dispersed electrodepositing solution for forming the insulating film including the polymer particles can be obtained, for example, by the following method. First, a diisocyanate component including an aromatic diisocyanate component as a monomer and an acid component including trimellitic anhydride are prepared, respectively. Then, an organic solvent such as N-methyl-2-pyrrolidone or N, N-dimethylformamide are charged into the flask at a predetermined ratio. It is preferable to use a four-necked flask equipped with a stirrer, a condenser tube, a nitrogen inlet tube, a thermometer and the like in the flask. It is preferable that the mixing ratio of the diisocyanate component and the acid component is such that the molar ratio is 1:1. The proportion of the organic solvent is preferably 1 to 3 times the mass of the resin obtained after synthesis. After these are introduced into the flask, the temperature is preferably elevated to a temperature of 80° C. to 180° C., preferably for 2 to 8 hours.

Thereafter, it is diluted with an organic solvent such as N-methyl-2-pyrrolidone to obtain a polyamide-imide resin varnish containing the above synthesized resin as a nonvolatile component in a proportion of preferably 20% to 50% by mass.

In order to prepare the water-dispersed electrodeposition solution for forming an insulating film including the above-mentioned polymer particles from the polyamide-imide resin varnish synthesized as described above, the prepared polyamide-imide resin varnish is mixed with an organic solvent. And then, after adding the basic compound to the mixture, water is added at an ambient temperature while stirring preferably at a rotation speed of 8000 rpm to 12000 rpm to sufficiently disperse. Thereby, the polymer particles included in the electrodeposition solution after preparation are controlled to be in the above-mentioned particle size distribution, in which the proportion of particles distributed within the range of ±30% of the median diameter ($D_{50}$) is 50% or more. A preferable ratio of each component in the electrodepositing solution is that, in a mass ratio of polyamide imide resin/organic solvent/water/basic compound=1-10%/70-79%/balance/0.05-0.1%. As the organic solvent used for the dilution, N-methyl-2-pyrrolidone, N, N-dimethylformamide, 1,3-dimethyl-2-imidazolidinone, N, N-dimethylacetamide, dimethyl sulfoxide, tetramethyl urea, hexaethylphosphoric acid triamide, γ-butyrolactam and the like can be used. Among these, 1,3-dimethyl-2-imidazolidinone is particularly preferably used because the solubility of the resin is high and the storage stability of the electrodeposition solution after preparation can be further improved. As the basic compound (dispersing agent or neutralizing agent), a hydrophilic basic compound such as 2-aminoethanol, pyridine, piperidine and triethylamine; a hydrophobic basic compounds such as tri-n-propylamine and dibutylamine; or the like can be used. Among them, a hydrophobic basic compound is particularly preferable, since the storage stability of the electrodeposition solution after preparation can be further improved. The reason for this is presumed that if it is a hydrophobic basic compound, the hydrophobic basic compound is present around the dispersed polymer particles after preparation of the electrodeposition solution. Thus, it becomes difficult for the dispersion medium of a hydrophilic organic solvent or water to be penetrated thereinto; and swelling of the particles is suppressed. Accordingly, aggregation and sedimentation of the polymer particles hardly occurs.

Through the above-described steps, the water-dispersed electrodepositing solution for forming an insulating film containing the polymer particles described above is obtained. In this embodiment, a method of producing the electrodeposition solution containing polymer particles made of polyamide-imide has been described. However, an electrodeposition solution containing polymer particles made of polyester-imide can be obtained in the same procedures and conditions except for using different kinds of monomers and/or organic solvents.

[Production of Insulator]

Next, a method of producing an insulator, in which an insulating film is formed on the metal surface by using the above-described water-dispersed electrodeposition solution for forming an insulating film, is explained as example of a method of producing an electrical insulated wire, on the surface of which an insulating film is formed, based on drawings. As shown in FIG. 1, the electrodepositing solution 11 is electrodeposited on the surface of the electric wire 12 by the electrodeposition coating method using the electrodeposition coating apparatus 10 to form the insulating layer 21*a*. Specifically, a columnar electric wire 13 having a circular cross section wound in a cylindrical shape in advance is electrically connected to the positive electrode of the DC power supply 14 via the anode 16. Then, the cylindrical electric wire 13 is pulled up in the direction of the solid arrow in FIG. 1 and subjected to the following steps.

First, as the first step, the cylindrical electric wire 13 is flattened by a pair of rolling rollers 17, 17 to form the rectangular electric wire 12 having a rectangular cross section. Examples of the electric wire includes: copper wire; aluminum wire; steel wire; copper alloy wire; aluminum alloy wire; and the like. Subsequently, as the second step, the electrodeposition solution 11 is stored in the electrodeposition bath 18, preferably maintained at a temperature of 5° C. to 60° C., and the rectangular shaped electric wire 12 is passed through the electrodeposition solution 11 in the electrodeposition bath 18. The cathode 19, which is electrically connected to the negative electrode of the direct current power source 14, is inserted in the electrodeposition solution 11 in the electrodeposition bath 18 spaced apart from the rectangular electric wire 12 passing therethrough the solution. When the rectangular electric wire 12 passes through the electrodeposition solution 11 in the electrodeposition bath 18, a DC voltage is applied between the rectangular electric wire 12 and the electrodeposition solution 11 by the direct current power supply 14. In this case, the DC voltage of the direct current power source 14 is preferably 1V to 300V, and the duration of energization of the direct current is preferably 0.01 second to 30 seconds. As a result, polymer particles (not shown) dispersed in the electrodeposition solution 11 are electrodeposited on the surface of the rectangular electric wire 12 to form the insulating layer 21a.

Next, the insulation coating 21b is formed on the surface of the electric wire 12 by applying a baking treatment to the flat wire 12 having the insulating layer 21a electrodeposited on its surface. In this embodiment, the electric wire 12 having the insulating layer 21a formed on its surface is passed through the interior of the baking oven 22. The baking treatment is preferably performed by a near infrared heating furnace, a hot air heating furnace, an induction heating furnace, a far infrared heating furnace, or the like. The temperature of the baking treatment is preferably in the range of 200° C. to 500° C., and the time of the baking treatment is preferably in the range of 1 minute to 10 minutes. Here, the reason for limiting the temperature of the baking treatment to the range of 200° C. to 500° C. is that the insulating layer 21a cannot be sufficiently cured at a temperature lower than 200° C., and when the temperature exceeds 500° C., the resin is thermally decomposed. The reason why the time of the baking treatment is limited within the range of 1 minute to 10 minutes is that the insulation layer 21a cannot be sufficiently cured at less than 1 minute and the resin is thermally decomposed at more than 10 minutes. The temperature of the baking process is the temperature of the center portion in the baking furnace. By passing through the baking furnace 22, the insulated electric wire 23 in which the surface of the electric wire 12 is covered with the insulating film 21b is produced.

EXAMPLES

Next, Examples of the present invention will be described in detail below together with Comparative Examples.

Example 1

First, 747 g of N-methyl-2-pyrrolidone as an organic solvent; 298 g of 4,4'-diphenylmethane diisocyanate (1.19 mol) as an isocyanate component; and 227 g of trimellitic anhydride (1.18 mol) as an acid component were placed in a 2 liter four-necked flask equipped with a stirrer, a cooling tube, a nitrogen inlet tube and a thermometer. Then, the temperature was raised to 130° C. By reacting the mixture at this temperature for about 4 hours, a polymer (polyamide-imide resin) having a number-based average molecular weight of 17,000 was obtained. In the following Table 1, the number-based average molecular weight and the weight-based average molecular weight of the obtained polymer are shown (same in each Example and each Comparative Example to be described later).

Then, a polyamide-imide varnish (polyamide-imide varnish/N-methyl-2-pyrrolidone=30 mass %:70 mass %) was obtained by diluting the polyamide-imide resin synthesized as described above with N-methyl-2-pyrrolidone as an organic solvent so that the concentration of the polyamide-imide (as a nonvolatile content) became 30 mass %. It was confirmed by FT-IR (Fourier Transform Infrared Spectroscopy) that polyamide-imide (polymer) was synthesized by the above-described polycondensation reaction.

Subsequently, 1.7 g of the polyamide-imide varnish obtained as described above was further diluted with 6.3 g of N-methyl-2-pyrrolidone; and 0.01 g of 2-aminoethanol as a basic compound was added. Then, 2 g of water was added at the ambient temperature (25° C.) while being stirred at a high rotational speed of 10,000 rpm to obtain the electrodeposition solution in which the polyamide-imide fine particles were dispersed in water (polyamide-imide resin/N-methyl-2-pyrrolidone/water/2-aminoethanol=5 mass %/75 mass %/19.9 mass %/0.1 mass %).

Subsequently, an insulator was produced using the electrodeposition solution prepared as described above. Specifically, first, the electrodeposition solution was stored in an electrodeposition bath, and the temperature of the electrodeposition solution in this electrodeposition bath was set to 25° C. Subsequently, a copper plate having a width of 2 mm, a length of 2 mm, and a thickness of 0.3 mm was used as an anode, a stainless steel plate inserted in the electrodeposition solution in the electrodeposition bath was used as a cathode, and a DC voltage was applied between the copper plate and the stainless steel plate with the applied 100 V. The copper plate was held in the electrodeposition solution in the electrodeposition bath at the above-described state for 30 seconds. As a result, an insulating layer was formed on the surface of the copper plate.

Next, the copper plate on which the insulating layer was formed on the surface was baked. Specifically, the copper plate on which the insulating layer was formed was held in a baking furnace maintained at a temperature of 250° C. for 3 minutes. As a result, an insulator having an insulating film having the film thickness shown in Table 1 below was obtained. The temperature inside the baking furnace was the temperature in the center portion in the furnace measured with a thermocouple.

Examples 2 to 8

By using the polyamide-imide varnish having a nonvolatile content of 30% by mass obtained in the same manner as in Example 1, electrodeposition solutions were obtained as in Example 1, except for adjusting the used amount of each component so as to have the ratio shown in Table 1 below.

Further, using the electrodeposition solutions prepared as described above, insulators were prepared in the same manner and under the same conditions as in Example 1.

Example 9

First, carboxylic acids, alcohols, and diamines were blended as raw materials of polyester-imide (monomers) into a 2 liter four-necked flask equipped with a stirrer, a cooling tube, a nitrogen inlet tube and a thermometer. Then, a catalyst was further blended in the mixture. Then, the temperature was raised to 235° C. and maintained for 3 hours to obtain a polymer (polyester-imide resin) having a number-based average molecular weight of 20,000. As the carboxylic acids, 196 g of trimellitic anhydride and 179 g of terephthalic acid were used. As the alcohols, 97 g of ethylene glycol and 253 g of tris (2-hydroxyethyl) isocyanurate were used. As the diamines, 99 g of 4,4'methylene diphenyl was used. As the catalyst, 1.2 g of tetrapropyl titanate (TPT) was used. Based on the fact that water is formed during the esterification reaction of the carboxylic acid and the hydroxyl group and the imidization reaction of the diamine and the anhydride group, completion of the reactions was confirmed by the theoretical water amount calculated from the amount of the monomer mixture and the water amount produced in synthesizing the above-described polyester-imide resin being matched.

Then, a polyester-imide varnish (polyester-imide resin/N-methyl-2-ryrrolidone=50 mass %/50 mass %) was obtained by diluting the polyester-imide resin synthesized as described above with N-methyl-2-pyrrolidone as an organic solvent so that the concentration of the polyester-imide (as a nonvolatile content) became 50 mass %. It was confirmed by FT-IR that polyester-imide was synthesized.

By using the polyester-imide varnish having a nonvolatile content of 50% by mass prepared as described above, an electrodeposition solution was obtained as in Example 1, except for adjusting the used mount of each component so as to have the ratio shown in Table 1 below.

Further, by using the electrodeposition solutions prepared as described above, an insulator was prepared in the same manner and under the same conditions as in Example 1.

Example 10

First, 747 g of N-methyl-2-pyrrolidone as an organic solvent; 298 g of 4,4'-diphenylmethane diisocyanate (1.19 mol) as an isocyanate component; and 227 g of trimellitic anhydride (1.18 mol) as an acid component were placed in a 2 liter four-necked flask equipped with a stirrer, a cooling tube, a nitrogen inlet tube and a thermometer. Then, the temperature was raised to 160° C. By reacting the mixture at this temperature for about 4 hours, a polymer (polyamide-imide resin) having a number-based average molecular weight of 25,000 was obtained.

Then, a polyamide-imide varnish (polyamide-imide varnish/N-methyl-2-pyrrolidone=20 mass %:80 mass %) was obtained by diluting the polyamide-imide resin synthesized as described above with N-methyl-2-pyrrolidone as an organic solvent so that the concentration of the polyamide-imide (as a nonvolatile content) became 20 mass %. It was confirmed by FT-IR (Fourier Transform Infrared Spectroscopy) that polyamide-imide (polymer) was synthesized by the above-described polycondensation reaction.

Subsequently, 2.5 g of the polyamide-imide varnish obtained as described above was further diluted with 5.5 g of N-methyl-2-pyrrolidone; and 0.01 g of 2-aminoethanol as a basic compound was added. Then, 2 g of water was added at the ambient temperature (25° C.) while being stirred at a high rotational speed of 10,000 rpm to obtain the electrodeposition solution in which the polyamide-imide fine particles were dispersed (polyamide-imide resin/N-methyl-2-pyrrolidone/water/2-aminoethanol=5 mass %/75 mass %/19.9 mass %/0.1 mass %). In addition, by using each of the electrodeposition solutions prepared as described above, an insulator was produced in the same method under the same condition as in Example 1.

Example 11

An electrodeposition solution was obtained as in Example 10, except for diluting 2.5 g of the polyamide-imide varnish having a nonvolatile content of 20 mass % obtained in the same manner as in Example 10 with 5.5 g of 1,3-dimethyl-2-imidazolidinone (DMI).

Further, by using the electrodeposition solution prepared as described above, an insulator was produced in the same manner and under the same conditions as in Example 10.

Example 12

An electrodeposition solution was obtained as in Example 10, except for: diluting 2.5 g of the polyamide-imide varnish having a nonvolatile content of 20 mass % obtained in the same manner as in Example 10 with 5.5 g of 1,3-dimethyl-2-imidazolidinone (DMI); and using 0.02 g of tri-n-propylamine which was a compound.

Further, by using the electrodeposition solution prepared as described above, an insulator was produced in the same manner and under the same conditions as in Example 10.

Comparative Examples 1 to 3

By using a polyamide-imide varnish having a nonvolatile content of 30% by mass obtained in the same manner as in Example 1, electrodeposition solutions were obtained as in Example 1, except for adjusting the used amount of each component so as to have the ratio shown in Table 1 below. However, all water was added at once without stirring at a high speed rotation in adding water.

Further, by using the electrodeposition solution prepared as described above, an insulator was produced in the same manner and under the same conditions as in Example 1.

Comparative Example 4

First, under nitrogen gas atmosphere, 1 g of polytetrafluoroethylene (hereinafter referred to as "PTFE") was added to 32.92 ml of N-methyl-2-pyrrolidone and stirred in a reaction vessel. Next, in an ice bath, 2 g (6.2 mmol) of 2,2'-ditrifluoromethyl-4,4'-diaminobiphenyl as an amine component and 0.6 g (6.2 mmol) of triethylamine were added to the above-described reaction vessel and dissolved. Then, 2.6 g (12.4 mmol) of trimellitic anhydride chloride as an acid component was added and stirred overnight. Then, 5.9 g (6.2 mmol) of aminopropyl-terminated polydimethylsiloxane (DMS-A 12) which is a soft segment component was added and stirred. Finally, triethylamine was added slowly so as not to cause precipitation so as to be equimolar with the acid component. Further, 100 ml of pure water is added thereto; and a water-soluble polyamide-imide electrodeposition solution (polyamideimide resin/N-methyl-2-pyrrolidone/water/triethylamine=8 mass %/22 mass %/69 mass %/1 mass %) was obtained. The number-based average molecular weight of the produced polymer (polyamide imide resin) was 5,000.

Further, by using the electrodeposition solution prepared as described above, an insulator was produced in the same manner and under the same conditions as in Example 1.

[Comparative Test and Evaluation]

The electrodeposition solutions obtained in Examples 1 to 12 and Comparative Examples 1 to 4 were evaluated as described following (i) to (vi). These results are shown in Table 1 below.

(i) Median diameter ($D_{50}$): By using the laser diffraction scattering type particle size distribution measuring apparatus (Model: LA-960 manufactured by Horiba, Ltd.) for each of the polymer particles synthesized in each Example and Comparative Example, the number-based median diameter ($D_{50}$) was measured.

(ii) Ratio of particles distributed within the range of ±30% of $d_{50}$: The ratio of particles distributed within the range of ±30% of the median diameter ($D_{50}$) with respect to all of the particles (in the range from [$D_{50}$–0.3$D_{50}$] μm to [$D_{50}$+0.3$D_{50}$] μm) was calculated from the number-based particle size distribution measured with the above-mentioned apparatus (iii) Surface potential: The surface potential of the polymer particles synthesized in each Example and Comparative Example was measured using a zeta potential meter (Model: DT1202 manufactured by Dispersion Technology Co.).

(iv) Film Thickness: With respect to the insulators produced in the respective Examples and Comparative Examples, the film thickness of the insulating film formed on the surface of the copper plate was measured by using a micrometer (Model: MDH-25M, manufactured by Mitutoyo Co., Ltd.).

(v) Liquid storage stability: The electrodeposition solutions prepared in the respective Examples and Comparative Examples were allowed to stand at room temperature for a certain period of time, and the presence or absence of precipitation was visually confirmed. In Table 1, "A" shows a case where no sedimentation was visually observed even after one month elapse, while "B" shows a case where there was no confirmation of the presence of precipitations after a lapse of one week, but it was confirmed after one month. "C" indicates a case where precipitation was not confirmed immediately after preparation of the electrodeposition solution but precipitation was confirmed after one week elapsed. "D" indicates a case where precipitation was confirmed immediately after preparation of the electrodeposition solution.

(vi) Molecular weight: With respect to the polymer particles in the electrodeposition solutions prepared in the respective Examples and Comparative Examples, the number-based average molecular weight and the weight-based average molecular weight of the polymers constituting the particles were measured. Specifically, the molecular weight measurement was performed by converting the measured value with a refractive index detector to a value corresponding to polystyrene by using a high-speed GPC apparatus (Model: HLC-8320 GPC manufactured by Tosoh Corporation), a column having an exclusion limit molecular weight of $4 \times 10^7$ or more (TSKgel Super AWM-H manufactured by Tosoh Corporation), The flow rate was 0.600 cc/min, the control temperature was 40° C., the sampling rate was $5 \times 10^{-3}$ cc/sec, and the sample injection amount was 0.010 cc. For the mobile phase, dimethylacetamide, to which 1 mmol of lithium bromide and 100 mmol of phosphoric acid were added as adsorption inhibitors, was used.

TABLE 1

| | Polymer particles | | | | | | | | | Evaluations | | |
|---|---|---|---|---|---|---|---|---|---|---|---|---|
| | Presence or absence of an anionic group | Presence or absence of siloxane bonding | Type | Number-based molecular weight | Weight-based molecular weight | $D_{50}$ [μm] | Ratio of particles within −30% to +30% [number %] | Organic solvent Ratio [mass %] | Water Ratio [mass %] | Basic compound Ratio [mass %] | Surface potential [mV] | Film thickness [μm] | Storage stability |
| Example 1 | Absent | Absent | Polyamide-imide | 17000 | 75000 | 0.14 | 100 | 5 | 75 | 19.9 | 0.1 | −49 | 30 | B |
| Example 2 | Absent | Absent | Polyamide-imide | 17000 | 75000 | 0.08 | 100 | 3 | 77 | 19.9 | 0.1 | −50 | 25 | B |
| Example 3 | Absent | Absent | Polyamide-imide | 17000 | 75000 | 0.19 | 80 | 8 | 74 | 19.9 | 0.1 | −53 | 33 | B |
| Example 4 | Absent | Absent | Polyamide-imide | 17000 | 75000 | 0.21 | 78 | 10 | 70 | 19.9 | 0.1 | −50 | 35 | B |
| Example 5 | Absent | Absent | Polyamide-imide | 17000 | 75000 | 0.25 | 80 | 5 | 75 | 19.95 | 0.05 | −40 | 24 | B |
| Example 6 | Absent | Absent | Polyamide-imide | 17000 | 75000 | 0.1 | 100 | 5 | 75 | 19.5 | 0.5 | −68 | 24 | B |
| Example 7 | Absent | Absent | Polyamide-imide | 17000 | 75000 | 0.48 | 53 | 3 | 77 | 19.99 | 0.01 | −12 | 23 | C |
| Example 8 | Absent | Absent | Polyamide-imide | 17000 | 75000 | 0.06 | 100 | 3 | 77 | 19.85 | 0.15 | −49 | 25 | B |
| Example 9 | Absent | Absent | Polyester-imide | 17000 | 75000 | 0.15 | 100 | 5 | 75 | 19.9 | 0.1 | −49 | 28 | B |
| Example 10 | Absent | Absent | Polyamide-imide | 25000 | 250000 | 0.12 | 100 | 5 | 75 | 19.9 | 0.1 | −52 | 30 | B |
| Example 11 | Absent | Absent | Polyamide-imide | 25000 | 250000 | 0.1 | 100 | 5 | 75 | 19.9 | 0.2 | −53 | 30 | B |
| Example 12 | Absent | Absent | Polyamide-imide | 25000 | 250000 | 0.2 | 100 | 5 | 75 | 19.8 | 0.2 | −50 | 30 | A |
| Comparative Example 1 | Absent | Absent | Polyamide-imide | 17000 | 75000 | 0.45 | 35 | 5 | 75 | 19.95 | 0.05 | −40 | 23 | D |
| Comparative Example 2 | Absent | Absent | Polyamide-imide | 17000 | 75000 | 0.01 | 100 | 3 | 77 | 19.5 | 0.5 | −65 | 4 | B |
| Comparative Example 3 | Absent | Absent | Polyamide-imide | 17000 | 75000 | 0.8 | 20 | 10 | 70 | 19.9 | 0.1 | −48 | 32 | D |
| Comparative Example 4 | Absent | Present | Water-soluble polyamide-imide | 5000 | 13000 | — | — | 8 | 22 | 69 | 1 | — | 4 | A |

As is apparent from Table 1, when comparing Examples 1 to 12 and Comparative Examples 1 to 4, precipitations were formed due to agglomeration of coarse polymer particles, which resulted in deteriorated storage stability, in Comparative Examples 1 and 3, in which the median diameter ($D_{50}$) of polymer particles was out of the predetermined range; and the number of particles distributed within the range of ±30% of the median diameter ($D_{50}$) did not reach to the predetermined ratio.

In Comparative Example 2, in which the number of particles distributed within the range of ±30% of the median diameter ($D_{50}$) was 50% or more of the total number of particles and the median diameter ($D_{50}$) was very small, there was no coarse polymer particle formed; and good results were obtained in the evaluations of the liquid storage stability or the like. However, in Comparative Example 2, $D_{50}$ was extremely small; and the polymer particles formed the continuous film in electrodeposition to deteriorate the electrodeposition ratio. Accordingly, the film thickness of the insulator film became extremely thin in Comparative Example 2. Similarly, in Comparative Example 4, in which polymer particles made of the water-soluble polyamide-imide was used, the electrodeposition was deteriorated due to the formation of the continuous film, resulting in an insulator film with an extremely thin film thickness.

On the contrary, in Examples 1 to 12, in which the polymer particles were made of polyamide-imide and/or polyester-imide free of an anionic group in the main chain thereof; the median diameter ($D_{50}$) was in the predetermined range; and the number of the particles distributed within the range of ±30% of the median diameter ($D_{50}$) satisfied the predetermined ratio, insulating films having the film thickness of 20 μm or more could be formed by an electrodeposition method, and good liquid storage stability was obtained, even though there was no need to perform operation for thermal dissolution or the like in preparation of the electrodeposition solution, and the surface potential was relatively low due to the usage of the material less expensive than the polyimide having an anionic group. In particular, in Example 12 in which DMI was used for dilution of the polyamide-imide resin varnish and a hydrophobic basic compound was used as the basic compound, the most excellent result was obtained in the evaluation of the liquid storage stability.

INDUSTRIAL APPLICABILITY

The present invention can be applied not only to the power inductor for a power supply of a personal computer, a smart phone, and the like; but to the electrical insulating wire used for the trans, reactor, motor, or the like of the inverter of an automobile or production of other insulators.

REFERENCE SIGNS LIST

11: Electrodeposition solution

What is claimed is:

1. A water-dispersed electrodeposition solution for forming an insulating film comprising:
   polymer particles;
   an organic solvent;
   a basic compound; and
   water, wherein
   the polymer particles are made of: any one of; or both of polyamide-imide and polyester-imide, main chains thereof being free of an anionic group,
   a number-based median diameter $D_{50}$ of the polymer particles is 0.05 μm to 0.5 μm,
   polymer particles having a particle size within −30% to +30% of the number-based median diameter $D_{50}$ are 50% or more of all of the polymer particles on a number basis, and
   a surface potential of the polymer particles is −10 mV to −70 mV, said surface potential being adjusted by a mass ratio between the polymer particles/the basic compound.

2. The water-dispersed electrodeposition solution for forming an insulating film according to claim 1, wherein the basic compound is a hydrophobic basic compound.

3. The water-dispersed electrodeposition solution for forming an insulating film according to claim 1, wherein the mass ratio is 1-10%/0.05-0.1%.

4. The water-dispersed electrodeposition solution for forming an insulating film according to claim 2, wherein the hydrophobic basic compound is any one of tri-n-propylamine and dibutylamine.

5. The water-dispersed electrodeposition solution for forming an insulating film according to claim 1, wherein the basic compound is a hydrophilic basic compound, and
   the hydrophilic basic compound is any one of 2-aminoethanol, pyridine, piperidine and trimethylamine.

\* \* \* \* \*